United States Patent [19]

Liebig

[11] Patent Number: 5,108,240
[45] Date of Patent: Apr. 28, 1992

[54] HEAVY LOAD BEARING TOGGLE BOLT

[76] Inventor: Heinrich Liebig, Wormser Strasse 23, D-6102 Pfungstadt, Fed. Rep. of Germany

[21] Appl. No.: 613,508
[22] PCT Filed: Apr. 9, 1990
[86] PCT No.: PCT/EP90/00556
　§ 371 Date: Nov. 5, 1990
　§ 102(e) Date: Nov. 5, 1990
[87] PCT Pub. No.: WO90/13751
　PCT Pub. Date: Nov. 15, 1990

[30] Foreign Application Priority Data

May 2, 1989 [DE] Fed. Rep. of Germany ....... 3914507

[51] Int. Cl.⁵ .............................................. F16B 21/00
[52] U.S. Cl. ...................................... 411/344; 411/21; 411/386
[58] Field of Search ................. 411/340, 344, 345, 21, 411/386, 387

[56] References Cited

U.S. PATENT DOCUMENTS

| | | | |
|---|---|---|---|
| 2,609,723 | 9/1952 | Stuggs | 411/340 |
| 2,916,235 | 12/1959 | Nagel | 411/340 |
| 3,127,807 | 4/1964 | Modrey | 411/340 |
| 3,248,994 | 5/1966 | Mortensen | 411/344 |
| 3,288,014 | 11/1966 | Mortensen | 411/344 |
| 4,232,497 | 11/1980 | Meschnig | 411/386 |

Primary Examiner—Neill R. Wilson

[57] ABSTRACT

Toggle bolt having an anchor screw threaded over at least a portion of its length, on whose end which is to be anchored in the cavity a toggle is mounted for pivoting between the legs of a shackle, between an insertion position aligned with the anchor screw and a locking position in which it lies across the axis of the latter.

13 Claims, 2 Drawing Sheets

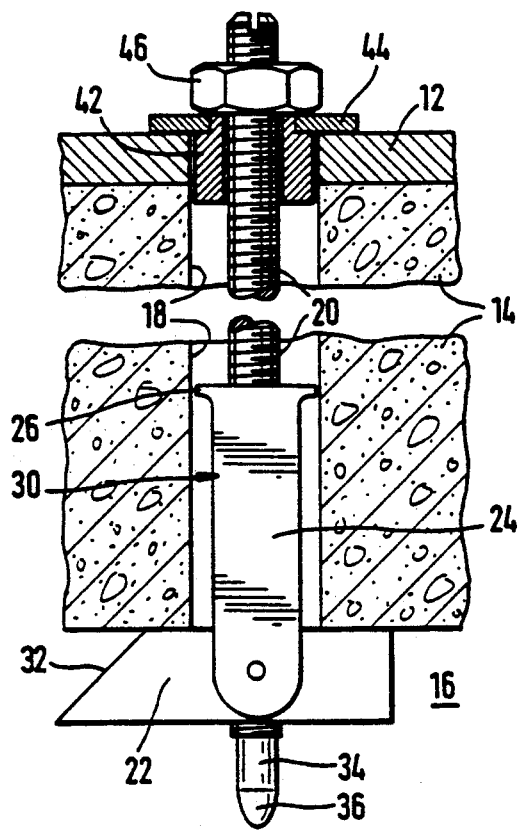
FIG. 1
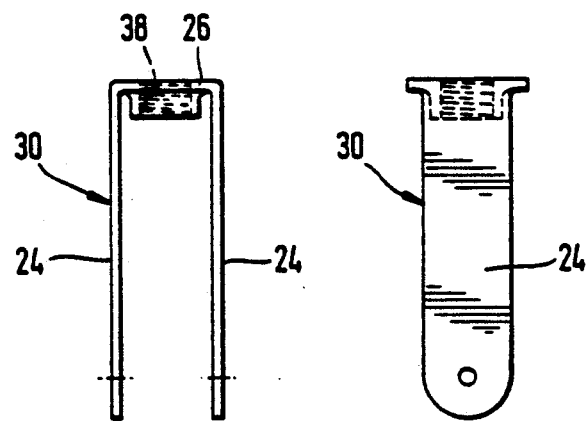
FIG. 7
FIG. 6
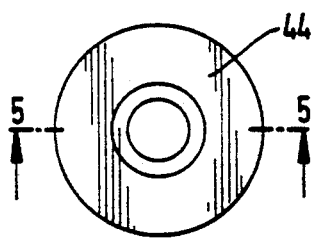
FIG. 4
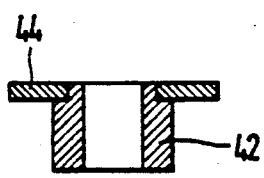
FIG. 5
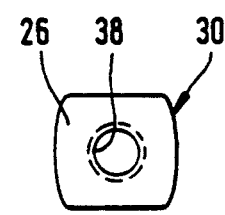
FIG. 8

HEAVY LOAD BEARING TOGGLE BOLT

BACKGROUND OF THE INVENTION

The invention relates to a means for anchoring in a cavity, which has a screw threaded over at least a portion of its length, on whose end to be anchored in a cavity a toggle is held so as to be rotatable between an insertion position aligned with the screw and a locking position crosswise on the screw.

Cavity anchors of this kind, which are also known as "toggle bolts," are known and serve for mounting relatively light workpieces and those subject to light external loads on hollow walls, e.g., finish walls hung at a distance from the actual solid wall, such as gypsum wallboard or the like, or walls constructed of hollow bricks containing air chambers. The screw of these toggle bolts, which as a rule is provided externally with a screw head, is screwed into a threaded bore in a short, transverse pin on which the toggle in the form of a piece of stamped sheet metal is pivoted such that it can be turned or tilted from an insertion position in which it lies against the screw to a locking position at right angles to the screw. The insertion of the toggle bolt into the mounting hole is performed in the above-mentioned insertion position, and the screw screwed into the threaded bore of the short pin is made so long that it can be inserted into the cavity to the depth necessary to allow the locking element to turn. After introduction into the mounting hole the toggle is then rotated 90° to the locking position by manipulating the screw. The screw is then driven on into the hole until the screw head provided on its end outside of the bore, or a washer disposed under this head, comes in contact with a workpiece that is to be mounted on the hollow wall, the toggle being tightened against the inside surface of the hollow wall defining the cavity. In this manner a positive mounting of the toggle bolt is achieved, which exerts no radial spreading pressure on the wall of the mounting hole and thus produces a secure fixation of the workpiece to be mounted on the wall by means of the toggle bolt.

The invention is addressed to the problem of applying the principle of the toggle bolt to a cavity anchor suitable for mounting heavy loads and withstanding great stress, which will be so constructed that the rotation of the toggle from the insertion position to the locking position will be performed positively, without the need to perform time-consuming and unreliable manipulation thereof via the screw.

THE INVENTION

Setting out from a cavity anchor of the kind described in the beginning, this problem is solved by the invention in that the toggle is mounted for pivoting within a shackle consisting of a pair of parallel legs joined together by a transverse portion at its end remote from the toggle, that a threaded bore is provided in the transverse section into which the threaded front end of the anchor shaft is screwed, and that the toggle contains a threaded through-bore whose central axis is aligned with the longitudinal central axis of the anchor screw.

In a preferred embodiment of the invention, the toggle is constituted by an elongated piece of metal that is substantially rectangular in plan and also rectangular in cross section, and the free ends of the shackle overlap the lateral surfaces of the metal piece and hold it in a pivotable manner, and the threaded bore passes centrally through the central area of the metal piece at right angles to the pivot axis, from the top to the bottom flat side. Since the toggle in the form of the metal piece is mounted between the legs of the shackle, which, in the insertion position, extend beyond the front end of the anchor screw by the amount necessary to allow the toggle to rotate, it is possible to make the metal toggle relatively massive, so that in the locking position it will be able to spread heavy loads over a large surface area of the inside face of the hollow wall. After the toggle has been rotated to the locking position, the anchor screw is screwed into the threaded bore in the toggle, so that then any forces applied to the anchor screw will be transferred directly via the threaded joint between the screw and the toggle. That is to say, the shackle serves only to mount the toggle for rotation, and does not participate in transmitting the fastening forces. Therefore the shackle can be made by stamping from relatively thin sheet metal.

To bring about the above-mentioned positive rotation of the toggle after it is introduced into the mounting hole it is recommendable that one of the transverse faces of the metal piece forming the toggle be a ramp formed at an angle to the flat sides for contact by the front end of the anchor screw screwed through the back of the shackle.

It has been found desirable for the ramp surface to be approximately at an angle of 40 to 50 degrees, preferably less than about 45 degrees, to the flat sides of the metal piece forming the toggle.

It is desirable to provide at the front end of the anchor screw that is to be driven through the shackle an unthreaded portion whose diameter corresponds approximately to the root diameter of the thread of the anchor screw, the length of the unthreaded portion being at least equal to the thickness of the metal piece forming the toggle, measured between the flat sides, and preferably also slightly longer. This will assure on the one hand that no threads can be damaged by the front end of the anchor screw that causes the toggle to rotate. The special size of the diameter of the unthreaded section assures, on the other hand, that upon passing into the threaded bore in the toggle this section will be guided on the threads of this threaded bore, thereby achieving an alignment of the threaded bore with the following, threaded section of the anchor screw such that the anchor screw thread will enter harmlessly into the threaded bore in the toggle. The positive rotation of the toggle from the insertion position to the locking position can furthermore be assisted by conically tapering the free end of the unthreaded section of the anchor screw, in which case it is then also desirable to countersink the threaded the threaded bore in the toggle at least at the end opening onto the flat side which is made shorter by the ramp surface of the metal piece.

In practice it has furthermore been found that it is desirable to offset the pivot axis of the toggle slightly from the central longitudinal axis of its threaded bore in order to prevent the toggle, which is already weakened by the threaded bore in its central area, from being additionally weakened in the weakest area by bores for pivot pins or the like.

The length of the shackle is best selected such that the metal piece can be rotated to a position between its legs, in which the lateral defining surfaces lie flush between the legs and the ramp engages the front end of the anchor screw driven through the threaded bore in the back end of the shackle.

Since the diameter of the mounting hole in which the toggle bolt in accordance with the invention is to be fastened has to be much larger than the diameter of the toggle bolt, on the basis of the width of the toggle and of the shackle in which it is mounted, it is recommended that a collar be provided which can be slipped onto the outer end of the anchor screw and has an inside diameter that is approximately the same as the outside diameter of the thread on the toggle bolt while its outside diameter is about equal to or slightly smaller than the diameter of the mounting hole into which the toggle bolt is to be introduced. The collar centers the anchor screw in the hole and protects the screw against any shear stresses exerted on the toggle bolt by a workpiece affixed to the wall. The outside end of the above-mentioned collar which centers anchor screw and absorbs shear stresses is best provided with a washer joined to form an integral unit with the collar and having a diameter greater than the diameter of the mounting hole. This prevents the collar from accidentally being pushed so far into the mounting hole that it would no longer be able to perform its centering and/or protective function.

DESCRIPTION OF THE DRAWINGS

The invention will be further explained in the following description of an embodiment in conjunction with the drawing wherein:

FIG. 1 shows how a workpiece is fastened to a hollow wall represented in cross section using a toggle bolt in accordance with the invention which is shown in a side elevational view, FIG. 4 is a top view of a collar joined together in one unit with a washer which is to be provided at the mouth of the hole when the toggle bolt is installed, FIG. 5 is a cross section seen in the direction of arrows 5—5 in FIG. 4, FIGS. 6, 7 and 8 are front, side and end views of the shackle serving to mount the toggle on the anchor screw.

DESCRIPTION OF PREFERRED EMBODIMENT

Figure 2:
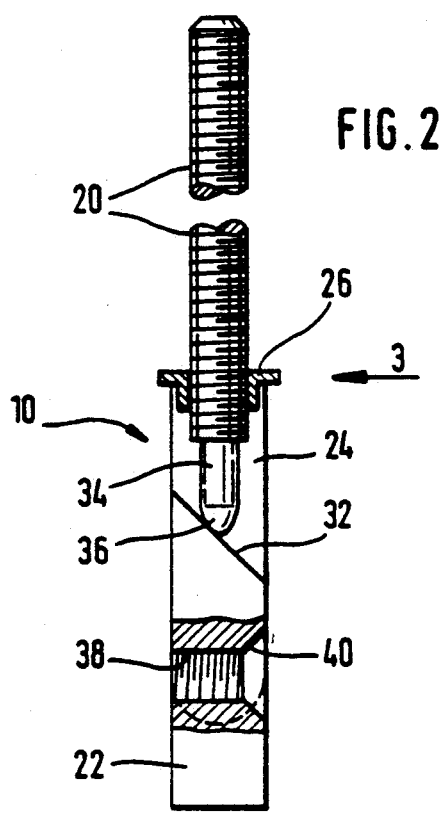
FIG. 2 shows a partially cross-sectional view of the toggle bolt used in the fastening arrangement shown in FIG. 1, which is partially cut-away in the area of the toggle.
Figure 3:
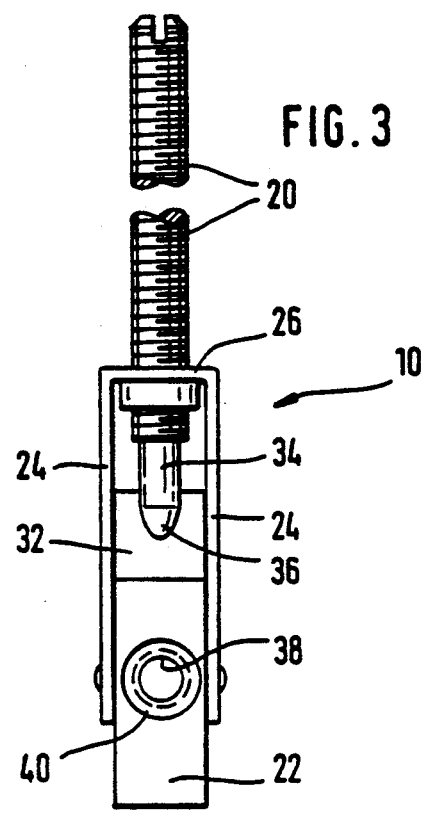
FIG. 3 is an elevation of the toggle bolt seen in the direction of arrow 3 in FIG. 2.

The toggle bolt in accordance with the invention, shown in FIGS. 1 to 3 and designated as a whole by the number 10, is intended for fastening heavy workpieces, and workpieces subject to great stress, such as the workpiece 12 indicated diagrammatically in FIG. 1 as a metal plate, onto a wall 14 which has one or more cavities 16 or whose back is a surface defining an inaccessible cavity (FIG. 1). The toggle bolt 10 is set in a mounting hole 18 passing from the accessible front of wall 12 into the cavity 16, and has for this purpose an elongated, threaded anchor screw 20 at whose cavity-interior end a toggle 22 is mounted for rotation between the legs 24 which extend at right angles from a crosspiece 26 containing a threaded bore 28 matching the thread of the anchor screw 20, thus forming a shackle 30 (FIGS. 6 to 8). The anchor screw 22 can be screwed through the threaded bore, and the lenght of the legs 24 is such that the toggle 22 formed by a piece of metal which is elongated, rectangular in cross section, and likewise substantially rectangular in plan, can be rotated until it is flush between the legs of the shackle in the manner represented in FIGS. 2 and 3, whenever the internal front end of the anchor screw 20 is screwed slightly through the threaded bore 28 and projects slightly from the crosspiece 26 between the legs 24.

Figure 9A:
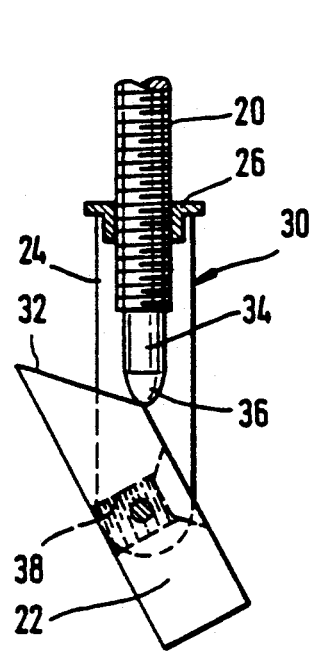
FIGS. 9a, 9b and 9c are a series of views of the inside end of the toggle bolt showing the successive stages of the positive rotation of the toggle to the locking position in which it is screwed onto the anchor screw.
Figure 9B:
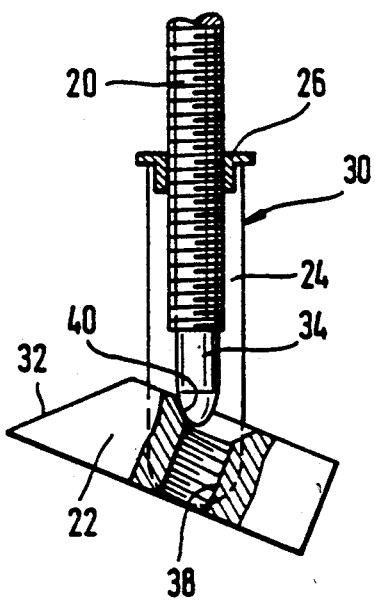

The face end provided on the raised end of the toggle 22 is in the form of a ramp 32 running at an angle of between 40 and 50 degrees, and it can be seen especially in FIGS. 2 and 3 that, when the toggle 22 is flush and aligned between the legs, this ramp 32 will just make contact with the front end of the anchor screw 20 when the front end reaches a certain depth between the legs 24. This is the insertion position of the toggle, which makes it possible to insert the toggle bolt 10 with the toggle forward into the mounting hole of appropriate diameter until the toggle held by the legs 24 is entirely within the cavity 16. By continuing to turn the front end of the anchor screw 20 into the threaded bore 28 of the crosspiece 26 of the shackle 30, the toggle can then be positively rotated as represented in FIG. 9. As the driving in of the anchor screw 20 continues, the front end of the latter presses against the ramp 32, which is driven aside in the manner represented in FIG. 9a, rotating the toggle 22 until the front end of the anchor screw passes over onto the upper flat side of the toggle adjoining the ramp, and then uses this flat side as additional contact surface for the further rotation of the toggle.

At the front end of the anchor screw 20 an unthreaded section 34 is formed by cutting away the threads down to the root diameter. Furthermore, the free end 36 of this unthreaded section 34 is tapered conically, the cone angle being selected such that, when the toggle is in the insertion position, a generatrix of the cone surface will be in contact with the ramp 32 of the toggle 22.

Figure 9C:
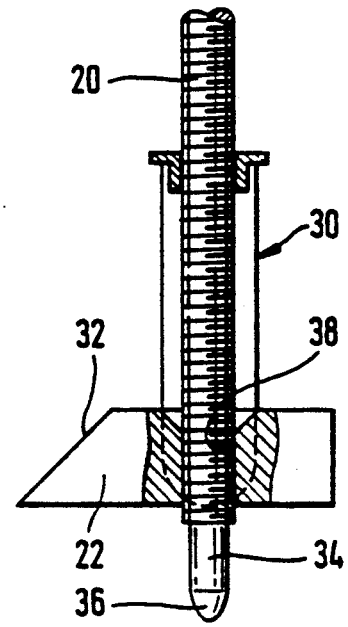

The toggle 22 contains in the area lying between the shackle legs 24 a threaded bore 38 (FIGS. 3, 9b and 9c) which, when the toggle 22 is rotated to the right-angle locking position in FIGS. 1 and 9c, is in alignment with the front end of the anchor screw, so that first the unthreaded section 34 of the anchor screw enters the threaded bore 38 and, as the turning of the screw continues, the thread of the anchor screw can mesh with the threaded bore 38 in the toggle. Since the unthreaded section 34 has presumably been turned down to the root diameter of the thread, and vice-versa the thread 38 in the toggle is complementary to the thread of the anchor screw 20, the unthreaded section 34 forms a centering section which, as it is increasingly turned into the threaded bore 38, cooperates with the crest of the threads of the threaded bore 38 and so aligns the toggle with the anchor screw 20 that its threaded portion adjoining the unthreaded section 34 comes into engagement with the threaded bore 38. In cooperation with the conical front end 36 of the anchor screw, a truncoconical countersink 40 (FIGS. 2, 3 and 9b) on the mouth of the threaded bore 38 at the anchor screw end assists the entry of the anchor screw into the threaded bore.

As soon as the anchor screw has been turned into the toggle 22 to the extent that thread engagement with the anchor screw is achieved over the entire length of the threaded bore 38 (FIGS. 1 and 9c) the load can be applied to the toggle bolt and the toggle can be tightened against the interior surface of the wall 16 defining the cavity 16.

For this purpose a collar 42 (FIGS. 1 and 5) is slipped over the end of the anchor screw associated with the mouth of the hole, and its thickness is made such that, in the hole mouth area, it centers the anchor screw in the mounting hole 18 with slight clearance. The collar 42 is united to a washer 44 of greater diameter to form an integral component, and on the surface of the workpiece 12 to be fastened on the wall 14 the washer 44 bears the tightening force of the nut 46 screwed onto the end of the anchor screw 20 (FIG. 1). In FIG. 1 it can be seen that the collar 42 can be made so long that it passes all the way through the mounting hole in the workpiece 12 and extends further into the mounting hole 18 in the wall. Thus the collar 42 serves not only as a centering means for the anchor screw 20, but also bears any shear stresses that might occur if the workpiece 12 should shift relative to the surface of the wall 14. That is, the anchor screw 20 is in any case relieved of shear forces by the collar 42.

In FIGS. 4 and 5 the collar is combined with the washer 44 to form a single component, the washer 44 being placed on a shoulder on the collar and then crimped to the collar. It is obvious that this component 42, 44, can also be made in one piece.

I claim:

1. Toggle bolt (10) for fastening preferably heavy workpieces (12) onto a wall (14) having one or more inaccessible cavities (16) at any distance from the accessible front of the wall (14) comprising
    an anchor screw (20) threaded over a portion of its length,
    a shackle (30) formed by two parallel legs (24) joined by a crosspiece (26) having a threaded bore (28),
    said shackle (30) screwed on said anchor screw (20) and inserted into a mounting hole (18) in the wall (14),
    a toggle (22) mounted pivotally between the shackle's legs (24),
    said toggle (22) having a threaded bore (38) into which the threaded front end of said anchor screw (20) is screwed,
    an abutment on the front side of the wall (14) formed by a threaded nut (46) screwed on said anchor screw and combined with a washer (44) which is united to a collar (42) slipped on said anchor screw (20).

2. A toggle bolt according to claim 1, wherein said shackle (3) is formed by stamping from the sheet metal.

3. A toggle bolt according to claim 1, wherein the length of said anchor screw (20) is adaptable to the distance between the front and the rear of the wall.

4. Toggle bolt according to claim 1, characterized in that the toggle (22) is formed by an elongated section, substantially rectangular in plan, of a metal piece also rectangular in cross section, that the free ends of the legs (24) overlap the lateral defining surfaces of the metal piece in its middle section and mount is pivotally, and that the threaded bore (38) passes centrally through the metal piece in its middle area at right angles to the pivot axis from the top to the bottom flat side.

5. Toggle bolt according to claim 4, characterized in that at least one of the transversely disposed faces of the metal piece forming the toggle (22) is configured as a ramp surface (32), running at an angle to the flat sides, for the front end of the anchor screw (20) screwed through the leg crosspiece (26).

6. Toggle bolt according to claim 5, characterized in that the ramp surface (26) is at an angle of 40 to 50 degrees, preferably about 45 degrees, to the flat sides of the metal piece forming the toggle (22).

7. Toggle bolt according to any one of claims 4 to 6 and 1, characterized in that the anchor screw (20) is provided in its front end area that is screwed through the leg crosspiece (26) with an unthreaded section (34) whose diameter corresponds approximately to the root diameter of the thread of the anchor screw (20).

8. Toggle bolt according to claim 7, characterized in that the length of the unthreaded section (34) of the anchor screw (20) is at least equal to the thickness of the metal piece forming the toggle, measured between the flat sides, and preferably slightly longer than this thickness.

9. Toggle bolt according to claim 7, characterized in that the free end of the unthreaded section (34) tapers conically (36).

10. Toggle bolt according to claim 6, characterized in that the threaded bore (38) in the toggle (22) is countersunk at least at the end (at 40) opening at the flat side that is shorter due to the slope of the ramp surface (26) of the metal piece.

11. Toggle bolt according to claim 4, characterized in that the pivot axis of the toggle (22) and the longitudinal central axis of the threaded bore (38) provided in the toggle are slightly offset from one another so that they do not intersect.

12. Toggle bolt according to claim 5, characterized in that the length of the legs (24) is selected such that the metal piece can pivot to a position between the legs (24) in which the lateral boundary surfaces lie flush between the legs (24) and the ramp surface (32) comes in contact with the front end of the anchor screw (20) screwed through the threaded bore in the leg crosspiece (26).

13. Toggle bolt according to claim 1, characterized by a collar (42) which can be slipped onto the end remote from the toggle of the anchor screw and has an inside diameter corresponding to or slightly larger than the outside diameter of the thread of the anchor screw (20), and an outside diameter corresponding to or slightly smaller than the diameter of the mounting hole (18) in which the toggle bolt (10) is to be set, and which is combined into an integral unit with a washer (44) at its end remote from the toggle, whose outside diameter is greater than the diameter of the mounting hole (18).

* * * * *